United States Patent [19]

Domurat

[11] Patent Number: 5,216,835
[45] Date of Patent: Jun. 8, 1993

[54] FLORAL DISPLAY AND TRANSPORTATION RACK

[76] Inventor: Kevin X. Domurat, 4135 Dixie Canyon Ave., Sherman Oaks, Calif. 91423

[21] Appl. No.: 778,666

[22] Filed: Oct. 18, 1991

[51] Int. Cl.⁵ .......................... A47G 7/04; A47G 1/06
[52] U.S. Cl. ................................................ 47/41.01
[58] Field of Search .................... 47/41.01, 66, 83, 85, 47/86, 87, 39

[56] References Cited

U.S. PATENT DOCUMENTS

| | | | |
|---|---|---|---|
| 1,064,813 | 6/1913 | Bloomberg | 47/41.01 |
| 1,965,152 | 7/1934 | Murray | 47/41.01 |
| 2,358,295 | 9/1944 | Bacigalupi | 47/41.01 |
| 5,085,002 | 2/1992 | Lee et al. | 47/41.01 |

FOREIGN PATENT DOCUMENTS 2237509 5/1991 United Kingdom ............... 47/41.01

Primary Examiner—Carl D. Friedman
Assistant Examiner—Joanne C. Downs
Attorney, Agent, or Firm—Monty Koslover Assoc.

[57] ABSTRACT

A floral rack, particularly designed to hold floral stand flower arrangements which relate to a prior invention. The rack has a multi-level configuration and may be hung on a wall peg through a hole at one end or placed horizontally on a shelf and a suitable surface or easily transported. The rack is light weight, being made of polystyrene sheet material. The multi-level rack has a long surface with a rim on three sides, and two or more trays mounted, spaced above the bottom surface. This permits a number of floral stand arrays to be loaded and held in position for separate access and removal by a customer, without disturbing other floral stands.

3 Claims, 1 Drawing Sheet

Fig. 1.
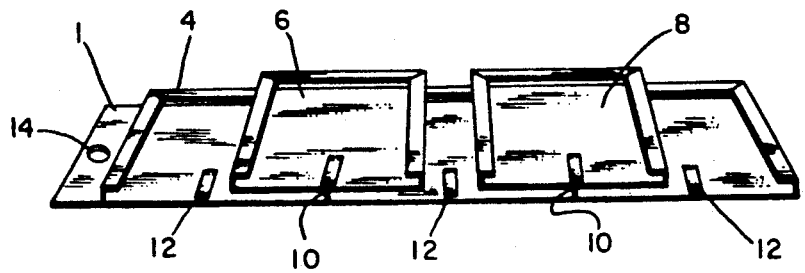
Fig. 2.
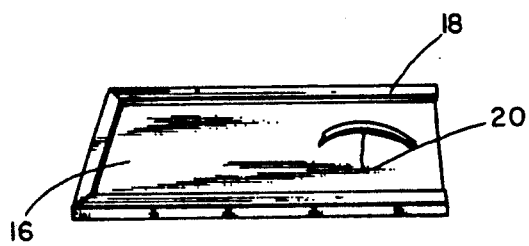
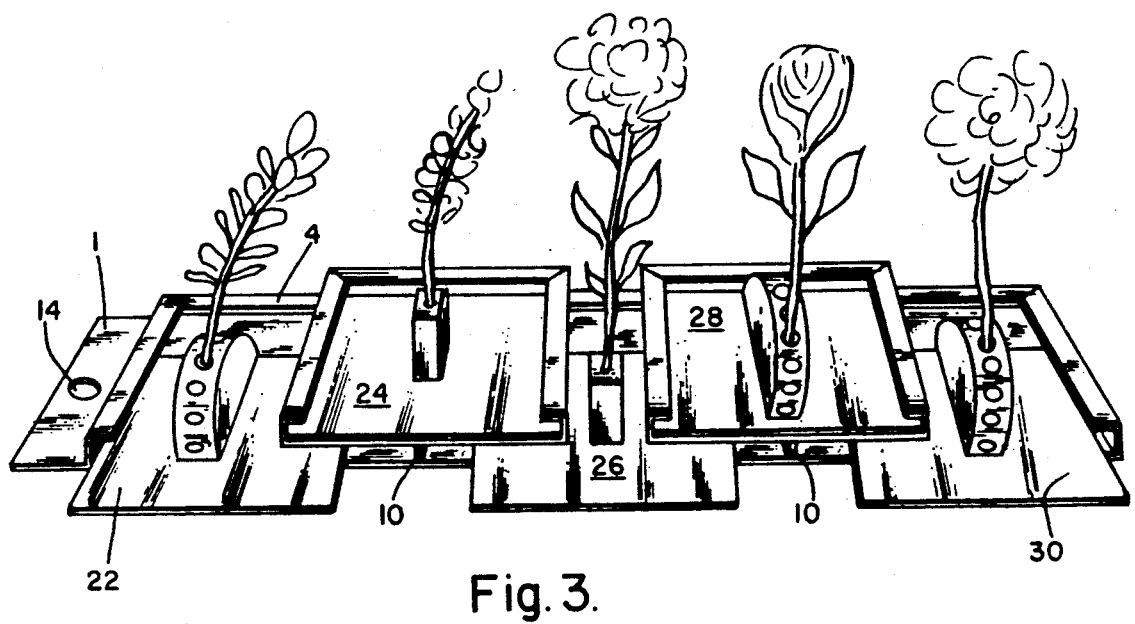
Fig. 3.

FLORAL DISPLAY AND TRANSPORTATION RACK

BACKGROUND AND SUMMARY OF THE INVENTION

This invention relates to sales racks for display of floral arrangements, and particularly to racks for the display and transportation of Floral Stand flower arrays.

An earlier patent application entitled "Floral Stand" by this inventor, describes flower holders that do not require a vase or dish, and may be mounted horizontally or vertically. These flower holders are mounted on bases made of rigid plastic sheet which are rectangular in shape.

The standard available display racks and transportation holders do not lend themselves to efficient display or carrying of the "Floral Stand" type arrangements. In part, this is due to the flat, sheet bases of the floral stands, which can occupy more space than is readily available on a shelf. The available racks also are not designed to take advantage of the ability of the floral stand arrays to be held and displayed in other than upright position. For these reasons, it was found advantageous to produce a rack configuration suited to the display and transportation of the floral stand flower holders.

The present invention is a floral rack, designed to hold the floral stands or anything having the appropriate bases. The rack is designed as a multi-level configuration. The configuration may be hung on a wall peg through a hole at one end, or placed horizontally on a shelf or suitable surface, or easily transported. The multi-level rack has a long surface with a rim on three sides, and at least two short racks mounted, spaced above the bottom surface. This permits a number of floral stand arrays to be loaded, held in position and to be separately accessed for removal by a customer, without disturbing other floral stands.

Accordingly, it is a principal object of this invention to provide a device that will hold floral stands efficiently for display and transportation;

Another object of this invention is to provide a device that will hold efficiently, any flower holder or article having a flat rectangular base of suitable size.

An advantage of the present invention is its light weight and low cost, relative to presently available means for display and transportation.

Further objects and advantages of the present invention will be apparent from study of the following portion of the specification, the claims and the attached drawings.

BRIEF DESCRIPTION OF THE DRAWINGS

FIG. 1 is a perspective view of a multi-level rack of the present invention;

FIG. 2 is a perspective view of a tray which is used as part of the multi-level rack or as a separate standard rack;

FIG. 3 is a perspective view of a multi-level rack of the present invention, particularly showing how the rack may be loaded with Floral Stand arrangements for display and transportation;

DESCRIPTION OF THE EMBODIMENTS

Referring particularly to the drawings, there are shown in FIGS. 1, 2 and 3, embodiments of the floral rack of the present invention. The floral rack is particularly designed for the display and transportation of floral stands. These floral stands are described in the accompanying U.S. patent application Ser. No. 07/743,218 "Floral Stand" by Kevin Domurat, which is incorporated herein by reference thereto. In FIG. 3, typical floral stand arrangements of flowers or branches, 22, 24, 26, 28 and 30 are shown placed in a multi-level floral rack 1 for display or transportation.

Referring now to FIG. 1, a multi-level floral rack 1 is illustrated. The rack 1 is made of rigid polystyrene plastic sheet or equivalent material, and comprises a backing sheet, a sidewall rim 4 attached to the sheet, at least two trays 6, 8, two or more projecting ridges 10 attached to the backing sheet and holding the trays 6, 8, and three or more retaining means 12 for holding floral stands in the rack. The number of trays 6, 8, depends on the selected length of the backing sheet. There may be more than the two trays 6, 8 illustrated as being mounted on the rack. This depends on the selected length of the rack backing sheet.

The retaining means 12 are bowed strips which are attached to the rack sheet or base, positioned near the open edges, and function to keep the floral stands from moving out inadvertently in transport or handling. The strips may be of spring steel or equivalent spring material.

The sidewall rim 4 is made of polystyrene plastic or equivalent material angle (90 deg.) section, cut to length and glued or otherwise fastened to the backing sheet. The rim 4 may also be molded to the backing sheet if that method of fabrication is preferred. It is mounted along two edges and across the width of the backing sheet, forming a "U" shaped enclosure. The sidewall rim 4, having a 90 degree angle section, has one of its two angled surfaces acting as a vertical back wall and its second surface overhanging the plane of the backing sheet. The overhanging surface acts to secure the floral stand bases in place and prevents them from falling out of the rack.

Space is left for a hole 14 cut in the backing sheet at the top (or left-hand) end, to be used for hanging the rack 1. The rack can also be supported by suction cups, although this would not be recommended for a heavily loaded rack.

Multiple projecting ridges 10 are glued, fastened or molded to the backing sheet for supporting the trays 6, 8. The ridges are spaced apart at a distance sufficient to permit the easy insertion of floral stand bases between them. One ridge is required for each tray which is supported. Each ridge 10 is made of rigid polystyrene plastic or equivalent material and is typically 1 to 1½ inch high by ¼ inch thick. The length of a ridge 10 is determined by the width of the rack backing sheet and the length of the tray 6, 8. The height of a ridge 10 is selected to be sufficient to allow a floral stand 22 to be comfortably inserted underneath a tray 6 mounted on the ridge 10, as shown in FIG. 3.

Each tray 6, 8, (also illustrated in FIG. 2,) is made in a similar fashion to the base structure, described earlier, of the multi-level rack 1, and is glued or fastened by screws to the top edge of a ridge 10.

A tray comprises a base sheet 16, three 90 degree angle section sidewalls 18 arranged around three sides and a retaining means 20 for holding floral stand bases in place. The base sheet 16 is rectangular shaped and sized to accommodate the bases of floral stands, allowing for the overhanging sidewalls. The sidewalls 18 are glued, fastened or molded to three edges of the base sheet in a continuous strip, leaving an open edge along one short length side.

As for the rack base structure, the tray is made of rigid polystyrene sheet, except for the retaining means 20 which is a bowed strip of spring steel or equivalent, attached near the tray open edge. As shown in FIG. 2, a tray may serve as a short rack for displaying a floral stand arrangement, when the tray is detached from the multi-level rack 1.

The multi-level rack 1 shown in FIGS. 1 and 3 permits a multiplicity of floral stands to be displayed or transported, while efficiently utilizing shelf space. It can also be hung on a wall as may be desired for display. This provides more display possibilities at the retail level where customers can see more merchandise (e.g. floral stands) in an area not normally used in this fashion. A customer would be able to choose the floral stand arrangement he or she wishes and remove it from the rack without disturbing the other floral stands.

From the foregoing description, it is believed that the objects of the present invention have been achieved. Various modifications may be apparent to those skilled in the art. These changes are considered to be in the spirit of this invention and are embraced thereby.

Having described the invention, what is claimed is:

1. A multi-level floral display and transportation rack comprising:
   a rectangular backing sheet made of rigid polystyrene plastic or equivalent material;
   a sidewall rim, being attached by glue, fastenings or molding around two edges and across a width of said backing sheet, forming a "U" shaped enclosure;
   a multiplicity of projecting ridges, being attached to a surface of said backing sheet by glue, fastenings or molding at spaced intervals;
   a multiplicity of trays for holding floral stands; each tray being attached on an underside of the tray to one of said projecting ridges; and
   a multiplicity of means for retaining floral stands on said backing sheet and trays; said means for retaining including a plurality of bowed strips of spring steel or an equivalent material; said projecting ridges being spaced sufficiently apart to permit easy insertion of floral stand bases between them; said projecting ridges and said sidewall rim being made of rigid polystyrene plastic or equivalent material;
   said trays being sized and configured to each hold and retain in place a floral stand base which is rectangular in shape;
   said backing sheet including a hole cut in the surface of said backing sheet at near to a top or a left end, for the purpose of hanging said rack on a wall if so desired.

2. The multi-level floral display and transportation rack of claim 1, wherein
   said sidewall rim has a 90 degree angle section, with one face acting as a vertical back wall and a second surface overhanging and in parallel with said backing sheet surface; said second surface holding floral stand bases securely to said rack.

3. The multi-level floral display and transportation rack of claim 1, wherein
   said trays each comprise a rigid base sheet of polystyrene plastic or equivalent material, three 90 degree angle section sidewalls of polystyrene plastic, and a means for retaining floral stand bases; said base sheet being rectangular and sized to accommodate a floral stand base; said sidewalls being glued, fastened or molded to three edges of said base sheet in a continuous strip, forming a rim; said means for retaining floral stand bases being attached to said base sheet of said tray near an open edge;
   said trays also serving as a short standard rack for floral stands, when detached from said multi-level rack.

* * * * *